No. 676,477. Patented June 18, 1901.
G. W. SMALL.
NUT LOCK.
(Application filed Apr. 3, 1901.)
(No Model.)

Witnesses
Jno. Imirie.
J. Stewart Rice.

Inventor
George W. Small
By
Ths. E. Robertson, Attorney

THE NORRIS PETERS CO., PHOTO-LITHO., WASHINGTON, D. C.

UNITED STATES PATENT OFFICE.

GEORGE W. SMALL, OF HARRISBURG, PENNSYLVANIA.

NUT-LOCK.

SPECIFICATION forming part of Letters Patent No. 676,477, dated June 18, 1901.

Application filed April 3, 1901. Serial No. 54,183. (No model.)

*To all whom it may concern:*

Be it known that I, GEORGE W. SMALL, a citizen of the United States, residing at Harrisburg, in the county of Dauphin, State of Pennsylvania, have invented a certain new and useful Improvement in Nut-Locks, of which the following is a specification, reference being had to the accompanying drawings.

This invention relates to an improvement in nut-locks in which a hardened washer is employed and which is provided with projecting teeth arranged to sink into or bite the surface against which it contacts, a soft metal washer being provided to coact with said hardened washer to lock the nut thereto.

My invention consists of a nut-lock of this character, as will be hereinafter more particularly described, and then definitely set forth in the claims at the end hereof.

Figure 1:
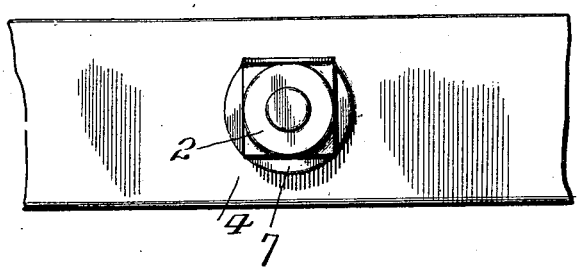
Figure 2:
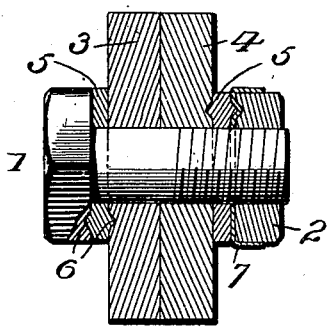
Figure 3:
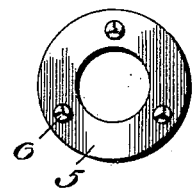
Figure 4:
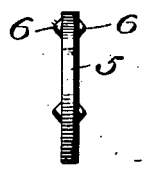
Figure 5:
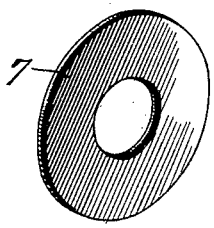

In the accompanying drawings, which represent the preferable embodiment of my invention, Figure 1 is a side elevation of my invention. Fig. 2 is a vertical longitudinal section of the same. Figs. 3 and 4 are detached views of the hardened washer, and Fig. 5 is a perspective view of the soft washer.

Referring now to the details of the drawings by numerals, 1 represents a bolt, and 2 a nut, each of which may be of the usual or any desired form and which are shown in the present instance as being employed for connecting the two bars 3 and 4.

5 represents a washer forming the principal part of my nut-lock and which is provided, preferably, on each of its sides with sharp-pointed projections or teeth 6 for the purpose of biting into the material with which they contact when in use. Two of these washers are preferably employed, as seen in Fig. 2, and while I have formed them with three teeth it is obvious that a greater or lesser number may be employed, if desired. These washers may be formed of hardened steel to render them more efficient in service. I use in connection with one of these washers a soft-metal washer 7, as will be hereinafter more fully described.

In operation one of the hardened washers 5 is slipped over the bolt 1 before the latter is inserted, so that when the bolt is pushed into position the washer 5 is between the head of the bolt and the surface of the bar 4 or other device to be bolted. A duplicate of the washer 5 is then slipped over the bolt on the outside of the bars being bolted, (see Fig. 2,) the soft-metal washer 7 placed over the bolt against it, and the nut 2 is then screwed on. It will be evident that as the nut is tightened the hardened teeth projecting from the washer 5 are forced into the surfaces next to them, thus forming depressions in said surfaces. Without any further manipulation the bolt-head is now firmly held in position; but it is of course necessary to employ some means of tying the nut 2 to its soft washer 7, or else the nut might be loosened by vibration. Various means may be used to accomplish this purpose; but I prefer to bend one or more of the projecting parts of the said washer 6 upwardly against one or more of the sides of the nut, as seen in Fig. 2, when the nut will be most securely locked in position and cannot be shaken or taken off until the washer 6 is restored to its former flat position.

I am fully aware that it is old to employ washers with teeth thereon for the purpose of locking nuts in position and that it is likewise not novel to bend part of a washer against the side of the nut, and therefore do not claim these, except when the washer with relatively hard teeth is arranged to coact with a relatively softer washer which is provided with some means of attaching it to a nut.

It is obvious that changes may be made without going outside the lines of my invention. For instance, other means of locking the soft washer to the nut may be employed, and, if desired, one of the soft washers may be placed between the hardened washer and the head of the bolt; but this latter is not necessary, and while I have used the term "hardened" washer I do not limit my claims to a washer which is made of any particular metal or which has been specially hardened, as it is manifest that the teeth alone need to be hard, and, in fact, I intend my claims to cover a washer with teeth, which washer (or its teeth) is relatively harder than the surface with which the teeth come in contact.

What I claim as new is—

1. In a nut-lock, a washer having a relatively hard point or tooth projecting therefrom in combination with a relatively softer metal washer coacting with said point or tooth and having means for securing it to the nut to be locked, substantially as described.

2. In a nut-lock, a washer having a sharpened point or tooth on each side thereof of relatively hard material, in combination with a relatively softer washer coacting with the tooth on one side of said first-mentioned washer and means for securing said softer washer to the nut to be locked, substantially as described.

3. In a nut-lock, a washer having relatively hard teeth projecting from each side thereof, in combination with a relatively softer washer coacting with the teeth on one side of said first-mentioned washer, and having a part arranged to be turned over to coact with the side of the nut to be locked, substantially as described.

In testimony whereof I affix my signature, in the presence of two witnesses, this 30th day of March, 1901.

GEORGE W. SMALL.

Witnesses:
FREDERICK M. OTT,
FORREST L. YODER.